Figure 1:
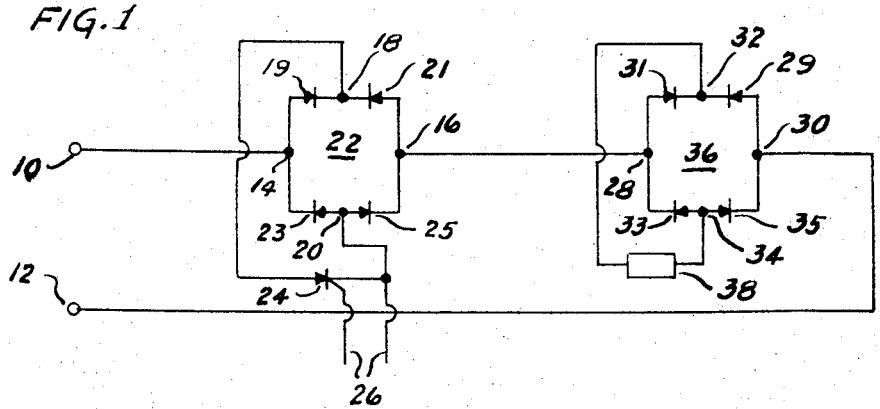

Dec. 3, 1968          O. E. REINERT          3,414,804
CONTROL SYSTEMS
Filed March 10, 1960

INVENTOR
OWEN E. REINERT
BY
Rey Eilers ATT'Y.

United States Patent Office 3,414,804
Patented Dec. 3, 1968

3,414,804
CONTROL SYSTEMS
Owen E. Reinert, Richmond Heights, Mo., assignor to
Sperry Rand Corporation, a corporation of Delaware
Filed Mar. 10, 1960, Ser. No. 14,087
12 Claims. (Cl. 323—22)

This invention relates to improvements in control systems. More particularly, this invention relates to improvements in control systems which utilize controlled rectifiers.

It is therefore an object of the present invention to provide an improved control system utilizing a controlled rectifier.

Controlled rectifiers have come into use and have proven to be desirable and useful electrical devices. Such rectifiers have been employed successfully in control systems that are supplied with alternating current and that are used to energize and de-energize loads of various kinds. In a typical installation, two controlled rectifiers are connected in the circuit that supplies power to the load; and one of those controlled rectifiers is connected so it controls the flow of current to the load during one half of the alternating current cycle, while the other of those controlled rectifiers is connected so it controls the flow of current to the load during the other half of the alternating current cycle. The controlled rectifiers in such an installation operate very well under normal conditions, but either of those controlled rectifiers could be damaged in the event an undue inverse voltage was applied to it; and there is always the possibility, in such an installation, that an undue inverse voltage could be applied to one or the other or both of those controlled rectifiers. It would be desirable to provide a control system that positively prevents controlled rectifier damage due to undue inverse voltages. The present invention provides such a control system, and it does so by connecting a controlled rectifier across the output of a bridge rectifier so the diodes of that bridge rectifier positively keep that controlled rectifier from being subjected to undue inverse voltages. It is therefore an object of the present invention to provide a control system wherein a controlled rectifier is connected across the output of a bridge rectifier so the diodes of that bridge rectifier positively keep that controlled rectifier from being subjected to undue inverse voltages.

In the control system provided by the present invention, the combination of the bridge rectifier and of the controlled rectifier connected across the output of that bridge rectifier supplants the two controlled rectifiers of the typical installation described above. That supplanting is desirable because it protects the controlled rectifier against damage due to undue inverse voltages; and it is also desirable because it enables the signal source to "see" the same controlled rectifier during both halves of the alternating current cycle. In the typical installation described above, the signal source will "see" one of the two controlled rectifiers during one half of the alternating current cycle, but it will "see" the other of those controlled rectifiers during the other half of the alternating current cycle. This is undesirable because no two controlled rectifiers will have exactly the same characteristics; and, therefore, the typical installation described above is objectionable. The present invention obviates that objection by providing a control system wherein the signal source "sees" the same controlled rectifier during both halves of the alternating current cycle. It is therefore an object of the present invention to provide a control system wherein the signal source "sees" the same controlled rectifier during both halves of the alternating current cycle.

The supplanting of the two controlled rectifiers of the typical installation described above by the combination of the bridge rectifier and of the controlled rectifier connected across the output of that bridge rectifier is additionally desirable because it reduces the peak losses. Further, that supplanting is desirable because it reduces the power that is consumed by the controlled rectifier for the same average current, and it thereby results in cooler operation for the same current level or permits operation at higher current levels with the same temperature rise.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 2:
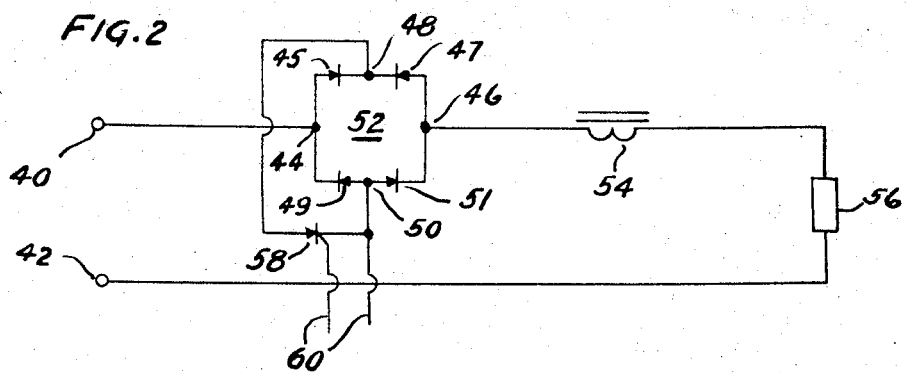
Figure 3:
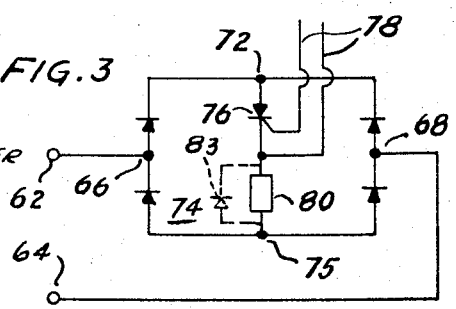
Figure 4:
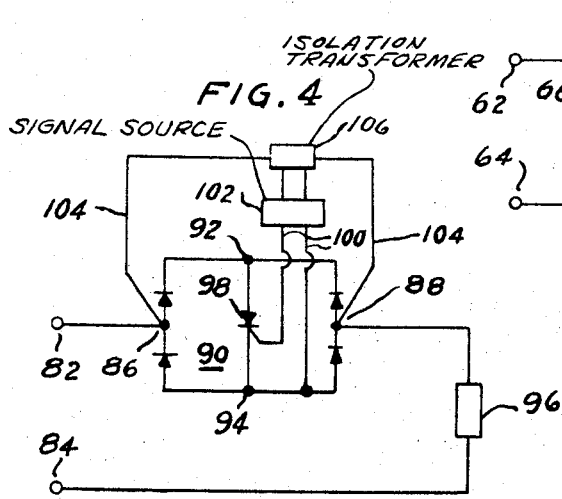

In the drawing, FIG. 1 is a schematic diagram of one circuit that embodies the control system of the present invention, FIG. 2 is a schematic diagram of a second circuit that embodies the control system of the present invention, FIG. 3 is a schematic diagram of a third circuit that embodies the control system of the present invention, and FIG. 4 is a schematic diagram of a fourth circuit that embodies the control system of the present invention.

Referring to the drawing in detail, the numerals 10 and 12 denote the power input terminals of a circuit which incorporates the control system provided by the present invention. Those terminals will be connected to a suitable source of alternating current, not shown. The numerals 14 and 16 denote the input terminals of a bridge rectifier 22 which includes four semi-conductor rectifiers of standard and usual design; and those rectifiers are denoted by the numerals 19, 21, 23 and 25. The numerals 18 and 20 denote the output terminals of the bridge rectifier 22, and those terminals are connected to the cathode and anode of a controlled rectifier 24 of standard and usual design. Leads 26 are connected to the gate and to the cathode of that controlled rectifier; and those leads will be suitably connected to a signal source, not shown. That signal source will preferably be a magnetic amplifier, but it could be a unijunction transistor, a flip-flop circuit, or the like. The principal requirement of the signal source is that it be able to provide a control pulse for each half of the cycles of the alternating current supplied to terminals 10 and 12. One important advantage of using a magnetic amplifier as the signal source connected to the leads 26 is the ability of a magnetic amplifier to provide a wave form that has a fast rise time and that can have the angular displacement of the point of rise readily adjusted.

The numerals 28 and 30 denote the input terminals of a second bridge rectifier 36 that includes four semi-conductor rectifiers of standard and usual form; and those rectifiers are denoted by the numerals 29, 31, 33 and 35. The numerals 32 and 34 denote the output terminals of the bridge rectifier 36, and those terminals are connected to a load 38. The power input terminal 10 is connected to input terminal 14 of bridge rectifier 22, power input terminal 12 is connected to input terminal 30 of bridge rectifier 36, and bridge rectifier input terminals 16 and 28 are connected together.

Whenever it is desired to cause current to flow through the load 38, the signal source will be caused to supply control pulses to the leads 26. If those control pulses have the required magnitude and duration, they will render the controlled rectifier 24 conductive during part or all of each half of the cycles of the alternating current supplied to the terminals 10 and 12. During a part of one half of each cycle wherein the controlled rectifier is conductive, current will flow from input terminal 12 to input terminal 30, through the rectifier 29, past outlet terminal 32, through the load 38, past output terminal 34, through the rectifier 33, past input terminal 28, past input terminal 16, through the rectifier 21, past output terminal 18, through the controlled rectifier 24, past output terminal 20, through the rectifier 23, and past input terminal 14 to terminal 10. During a part of the other half of each cycle wherein the controlled rectifier is conductive, current will flow from input terminal 10 to input terminal 14, through the retcifier 19, past output terminal 18, through the controlled rectifier 24, past output terminal 20, through the rectifier 25, past input terminal 16, past input terminal 28, through the rectifier 31, past terminal 32, through the load 38, past output terminal 34, through the rectifier 35, and past input terminal 30 to input terminal 12. As a result, current will flow through the load 38 during a part of each half of each cycle wherein the controlled rectifier 24 is conductive. The flow of current through the load 38 is in the same direction during both halves of the cycle of the alternating current supplied to the terminals 10 and 12; and hence the load 38 can be a DC load.

Until the signal source supplies control pulses of the required magnitude and duration to the leads 26, the controlled retcifier 24 will remain non-conductive; and no current will flow through the load 38. However, when control pulses of the required magnitude and duration are supplied to the leads 26, the controlled rectifier 24 will become conductive and will permit current to flow through the load 38. Where the load 38 has negligible inductance, the current through the controlled rectifier 24 will readily fall to zero during each half cycle of the alternating current supplied to the input terminals 10 and 12; and, as that current does so, the controlled rectifier 24 will have time to become extinguished and thereby become non-conductive. This is desirable because it makes certain that the controlled rectifier 24 will be able to control the succeeding half cycle of that alternating current. Where the load 38 has appreciable inductance, and would thus tend to keep the current through the controlled rectifier 24 from readily falling to zero during each half cycle of the alternating current supplied to the input terminals 10 and 12, the rectifiers 33 and 31 or the rectifiers 35 and 29 will constitute an alternate discharge path for dissipation of the inductive energy in the load 38, thereby permitting the current through the controlled rectifier 24 to readily fall to zero during each half cycle of the alternating current supplied to the input terminals 10 and 12. Consequently, the controlled rectifier 24 will be able to control the succeeding half cycle of the alternating current. This means that the circuit of FIG. 1 will always remain under the control of the controlled rectifier 24 even though the load 38 is inductive.

Referring to FIG. 2, the numerals 40 and 42 denote the power input terminals of a second circuit which incorporates the control system provided by the present invention. The input terminal 40 is connected to the input terminal 44 of a bridge rectifier 52, and the numeral 46 denotes the other input terminal of that bridge rectifier. That bridge rectifier has four semi-conductor rectifiers 45, 47, 49 and 51. The numerals 48 and 50 denote the output terminals of the bridge rectifier 52, and those terminals are connected to the cathode and anode of a controlled rectifier 58. The numeral 60 denotes leads that are connected to the cathode and gate of that controlled rectifier; and those leads will be connected to a suitable signal source, not shown. A saturating choke 54 is connected between the input terminal 46 of the bridge rectifier 52 and one terminal of a load 56. The other terminal of the load 56 is connected to the power input terminal 42.

The bridge rectifier 52 is comparable to the bridge rectifier 22 of FIG. 1, and the controlled rectifier 58 is comparable to the controlled rectifier 24 of FIG. 1. However, the load 56 in FIG. 2 is supplied with alternating current whereas the load 38 in FIG. 1 is supplied with direct current.

Whenever it is desired to cause curernt to flow through the load 56, the signal source will be caused to supply control pulses to the leads 60. If those control pulses have the required magnitude and duration, they will render the controlled retcifier 58 conductive during part or all of each half of the cycles of the alternating current supplied to the terminals 40 and 42. During a part of one half of each cycle wherein the controlled rectifier is conductive, current will flow from terminal 40 to terminal 44, through the rectifier 45, past output terminal 48, through the controlled rectifier 58, past output terminal 50, through the rectifier 51, past input terminal 46, through the choke 54, and then through the load 56 to terminal 42. During a part of the other half of each cycle wherein the controlled rectifier is conductive, current will flow from terminal 42 to and through the load 56, through the choke 54, past input terminal 46, through the rectifier 47, past output terminal 48, through the controlled rectifier 58, past output terminal 50, through the rectifier 49, and past input terminal 44 to terminal 40. As a result, curernt will flow through the load 56 during a part of each half of each cycle wherein the controlled rectifier 58 is conductive. However, the current will flow in opposite directions through the load 56 during alternate half cycles.

The saturating choke 54 is desirable where the load 56 is highly inductive, because it provides adequate extinguishing time for the controlled rectifier 58. Specifically, the choke 54 has a non-saturated, exciting current which is smaller than the holding current of the controlled rectifier 58, and that choke requires a longer time to reach saturation than the controlled rectifier 58 requires to become extinguished. This means that during each half cycle of the alternating current supplied to the terminals 40 and 42, the choke 54 will hold the current flowing through it, and thus through the controlled rectifier 58, down to a value which is below the value of the holding current of that controlled rectifier. Further, that choke will hold that current down to that value for a period of time longer than the period of time which the controlled rectifier 58 needs to become extinguished and thereby become non-conductive. The overall result is that the choke 54 will make certain that the controlled rectifier will control the succeeding half cycle of the alternating current supplied to the terminals 40 and 42.

Referring to FIG. 3, the numerals 62 and 64 denote the power input terminals of a third circuit which incorporates the control system of the present invention. The terminal 62 is connected to the input terminal 66 of a bridge rectifier 74, and the terminal 64 is connected to the input terminal 68 of that bridge rectifier. The numerals 72 and 75 denote the output terminals of the bridge rectifier 74, and a controlled rectifier 76 and a load 80 are connected in series between those output terminals. The numeral 78 denotes leads which are connected to the cathode and gate of the controlled rectifier 76 and to a suitable signal source, not shown.

The bridge rectifier 74 will coact with the controlled rectifier 76 to cause current to flow through the load 80 in the same direction during part of each half cycle wherein that controlled rectifier is conductive. In this respect, the circuit of FIG. 3 is similar to the circuit of FIG. 1. However, the circuit of FIG. 3 uses fewer components and is thus less expensive than is the circuit of FIG. 1. The circuit of FIG. 3 is particularly useful with loads that have only negligible inductance. That circuit could, however, easily be used with a load that has appreciable inductance by connecting a diode, a resistor or a capacitor in parallel with that load; because that diode, resistor or capacitor would provide an alternate discharge path for the inductive energy of that load during each half cycle. As a result, even though the current passing through the controlled rectifier 76 is direct current and thus does not go through zero, that current will be caused to fall close to zero during each cycle and thereby cause the controlled rectifier 76 to become extinguished and non-conductive. In the particular embodiment shown, a semi-conductor rectifier 83 is connected in parallel with the load 80; but that rectifier is shown in dotted lines because a capacitor or a resistor could be used in its place, and because neither a rectifier nor a capacitor nor a resistor would be used if the load 80 had negligible inductance.

Referring to FIG. 4, the numerals 82 and 84 denote the power input terminals of a fourth circuit which incorporates the control system of the present invention. The input terminal 82 is connected to the input terminal 86 of a birdge rectifier 90, and the input terminal 84 is connected to one terminal of a load 96. The other input terminal 88 of the bridge rectifier 90 is connected to the other terminal of the load 96. The output terminals of the bridge rectifier 90 are denoted by the numerals 92 and 94, and a controlled rectifier 98 has its cathode and anode connected to those terminals. The numeral 100 denotes leads which are connected to the cathode and gate of the controlled rectifier 98 and to a suitable signal source 102. That signal source could be a magnetic amplifier, a unijunction transistor, a flip-flop circuit, or the like. Preferably that signal source is a magnetic amplifier which has the power output terminals thereof connected to the leads 100; and that magnetic amplifier will preferably have its power input connected to the bridge rectifier terminals 86 and 88 by leads 104 and by an isolation transformer 106. Where that is done, the controlled rectifier 98 will short out the power input of the magnetic amplifier 102 whenever that controlled rectifier becomes conductive.

Where the circuit of FIG. 4 does not have the power input of the magnetic amplifier 102 connected to the input terminals of the bridge rectifier 90, that circuit will be generally comparable to the circuit of FIG. 2, but it will not have the saturating choke 54. The circuit of FIG. 4 is very useful where the controlled rectifier 98 has ample extinguishing time.

Where the circuit of FIG. 4 has the power input of the magnetic amplifier 102 connected to the input terminals of the bridge rectifier 90, that circuit will be particularly desirable because it will supply current to the gate-cathode circuit of the controlled rectifier 98 only during those portions of the half cycles of the alternating current wherein the controlled rectifier 98 is non-conductive. Specifically, the magnetic amplifier 102 will be able to supply pulses to the controlled certifier 98 during only those portions of the half cycles of the alternating current wherein the controlled rectifier 98 is non-conductive, because that controlled rectifier will short out the power input of that magnetic amplifier as soon as that controlled rectifier fires. Thereafter, that magnetic amplifier will supply no further current to the gate-cathode circuit of the controlled rectifier 98 until that controlled rectifier becomes extinguished and thereby removes the short across the power input of that magnetic amplifier. Such an arrangement is desirable because it reduces heating in the gate-cathode circuit of the controlled rectifier 98. Further, that arrangement is desirable because it reduces the magneto-motive force impressed upon the core of the magnetic amplifier 102 after saturation and thereby reduces the harmonic voltages in the control winding of the magnetic amplifier 102.

Where the signal sources of FIGS. 1 and 2 are the power outputs of magnetic amplifiers, the power inputs of those magnetic amplifier can be connected to the input terminals of the bridge rectifiers 22 and 52, respectively. Where that is done, reduced heating in the gate-cathode circuits of the controlled rectifiers 24 and 58, respectively, will be attained. Further, where that is done, reduced magneto-motive forces will be impressed upon the cores of those magnetic amplifiers after saturation.

Whereas the drawing and accompanying description have shown and described several preferred embodiments of the present invention it should be apparent to those skilled in the art that various changes may be made in the form of the invention without affecting the scope thereof.

What I claim is:

1. A control system that can be used with circuits to which alternating current is supplied and that can be used to control the application of current to a load and that comprises a bridge rectifier and a controlled rectifier having the cathode and anode thereof connected across the output of said bridge rectifier, two of the rectifiers of said bridge rectifier permitting the current to pass through said controlled rectifier during part of one half of each cycle of the alternating current whenever said controlled rectifier is conductive, the other two rectifiers of said bridge rectifier permitting current to pass through said controlled rectifier during part of the other half of each cycle of the alternating current whenever said controlled rectifier is conductive, said controlled rectifier having the cathode and gate thereof connectable to a signal source that can supply pulses to said cathode and gate during any half cycle of the alternating current and thereby render said controlled rectifier conductive during any half of any cycle of the alternating current, said rectifiers of said bridge rectifier keeping said controlled rectifier from being subjected to undue inverse voltages and thereby protecting said controlled rectifier from damage due to undue inverse voltages, said signal source being a magnetic amplifier that has the power output thereof connectable to said cathode and gate of said controlled rectifier and that has the power input thereof connectable to the input terminals of said bridge rectifier, said power input of said magnetic amplifier drawing appreciable current whenever said controlled rectifier is non-conductive but being substantially shorted whenever said controlled rectifier becomes conductive, whereby said power input of said magnetic amplifier draws appreciable current only during those portions of any half cycle of the alternating current prior to the firing of said controlled rectifier.

2. A control system that can be used with circuits to which alternating current is supplied and that can be used to control the application of current to a load and that comprises a bridge rectifier and a controlled rectifier having the cathode and anode thereof connected across the output of said bridge rectifier, said controlled rectifier having the cathode and gate thereof connectable to the power output of a magnetic amplifier that has the power input thereof connectable to the input terminals of said bridge rectifier, said power output of said magnetic amplifier being adapted to supply pulses to said cathode and gate and thereby render said controlled rectifier conductive, said power input of said magnetic amplifier drawing appreciable current whenever said controlled rectifier is non-conductive but being substantially shorted whenever said controlled rectifier becomes conductive, whereby said power input of said magnetic amplifier draws appreciable current only prior to the firing of said controlled rectifier.

3. A control system that can be used with circuits to which alternating current is supplied and that can be used to control the application of current to a load and that comprises a controlled rectifier that passes current to said load whenever it becomes conductive, said controlled rectifier having the cathode and gate thereof connectable to the power output of a magnetic amplifier, said magnetic amplifier having the power input thereof connected on opposite sides of said controlled rectifier whereby said controlled rectifier can short said power input of said magnetic amplifier whenever said controlled rectifier becomes conductive, said power input of said magnetic amplifier drawing appreciable current whenever said controlled rectifier is non-conductive but being substantially shorted whenever said controlled rectifier becomes conductive, whereby said power input of said magnetic amplifier draws appreciable current only prior to the firing of said controlled rectifier.

4. A control system that can be used with circuits to which alternating current is supplied and that can be used to control the application of current to a load and that comprises rectifying means and a controlled rectifier connected across the output of said rectifying means, said controlled rectifier having the cathode and gate thereof connectable to a signal source that can supply pulses to said cathode and gate and thereby render said controlled rectifier conductive, said controlled rectifier responding to the falling of current to zero during each half cycle of the alternating current to become non-conductive, thereby obviating all need of a commutating capacitor for said controlled rectifier, said load being connected between one of the input terminals of said rectifying means and one side of line, whereby said controlled rectifier and said rectifying means cause alternating current to flow toward said load although said controlled rectifier passes only uni-directional current, said controlled rectifier in conjunction with said rectifying means serving as an alternating current switch.

5. A control system that can be used with circuits to which alternating current is supplied and that can be used to control the application of alternating current to a load and that comprises rectifying means and a controlled rectifier having the cathode and anode thereof connected across the output of said rectifying means, said controlled rectifier having the cathode and gate thereof connectable to a signal source that can supply pulses to said cathode and gate during any half cycle of the alternating current and thereby render said controlled rectifier conductive during any half of any cycle of the alternating current, said controlled rectifier responding to the falling of current to zero during each half cycle of the alternating current to become non-conductive, thereby obviating all need of a commutating capacitor for said controlled rectifier, said controlled rectifier being "seen" by the signal source during each half cycle of the alternating current, said rectifying means and said controlled rectifier being connected to supply alternating current to said load.

6. A control system that can be used with circuits to which alternating current is supplied and that can be used to control the application of alternating current to a load and that comprises a bridge rectifier and a controlled rectifier having the cathode and anode thereof connected across the output of said bridge rectifier, two of the rectifiers of said bridge rectifier permitting current to pass through said load in a predetermined direction and to pass through said controlled rectifier during part of one half of each cycle of the alternating current whenever said controlled rectifier is conductive, the other two rectifiers of said bridge rectifier permitting current to pass through said load in the opposite direction and to pass through said controlled rectifier during part of the other half of each cycle of the alternating current whenever said controlled rectifier is conductive, said controlled rectifier having the cathode and gate thereof connectable to a signal source that can supply pulses to said cathode and gate during any half cycle of the alternating current and thereby render said controlled rectifier conductive during any half of any cycle of the alternating current, said controlled rectifier responding to the falling of current to zero during each half cycle of the alternating current to become non-conductive, thereby obviating all need of a commutating capacitor for said controlled rectifier, said rectifiers of said bridge rectifier keeping said controlled rectifier from being subjected to undue inverse voltages and thereby protecting said controlled rectifier from damage due to undue inverse voltages.

7. A control system that can be used with circuits to which alternating current is supplied and that can be used to control the application of alternating current to a load and that comprises rectifying means and a controlled rectifier connected across the output of said rectifying means, said controlled rectifier having the cathode and gate thereof connectable to a signal source that can supply pulses to said cathode and gate during any half cycle of the alternating current and thereby render said controlled rectifier conductive during any half of any cycle of the alternating current, said rectifying means and said controlled rectifier being connected to supply alternating current to said load, said controlled rectifier responding to the fall of current to zero during each half cycle of the alternating current to become non-conductive, thereby obviating all need of a commutating capacitor for said controlled rectifier, and a saturating choke that is in series with the load, said saturating choke having a non-saturated exciting current that is less than the holding current of said controlled rectifier and requiring more time to become saturated than said controlled rectifier requires to become extinguished.

8. A control system that can be used with circuits to which alternating current is supplied and that can be used to control the application of alternating current to a load and that comprises rectifying means and a controlled rectifier connected across the output of said rectifying means, said controlled rectifier having the cathode and gate thereof connectable to a signal source that can supply pulses to said cathode and gate during any half cycle of the alternating current and thereby render said controlled rectifier conductive during any half of any cycle of the alternating current, said controlled rectifier responding to the fall of current to zero during each half cycle of the alternating current to become non-conductive, thereby obviating all need of a commutating capacitor for said controlled rectifier, and a saturating choke that is in series with the load, said saturating choke having a non-saturated exciting current that is less than the holding current of said controlled rectifier and requiring more time to become saturated than said controlled rectifier requires to become extinguished, said saturating choke and said load being connected in the circuit that is connected to the input terminals of said rectifying means, whereby said saturating choke and said load are supplied with alternating current.

9. Semiconductor controlled rectifier circuits comprising a full wave rectifier including input and output circuits, a semi-conductor controlled rectifier including an anode, a cathode and a gate, means connecting the anode and cathode of the controlled rectifier in series in the full wave rectifier output circuit, output terminals in series in the full wave rectifier input circuit adapted to be connected to a load, means to supply timed steep wave front current pulses to the controlled rectifier gate to initiate conduction of the controlled rectifier, and means responsive to conduction of the controlled rectifier to cut off the current pulse that initiated said conduction.

10. A phase controlled alternating current circuit comprising: first and second alternating current source terminals; first and second alternating current load terminals; a fullwave rectifier circuit having first and second alternating current input terminals and first and second direct current output terminals; means connecting said first alterating current input terminal to said first alternating current source terminal; means connecting said alternating current load terminals in series between said second alternating current input terminal and said second alternating current source terminal; a controlled rectifier connected between said direct current output terminals of said rectifier circuit such that forward bias is applied to said controlled rectifier each half cycle of said alternating current source; and means for controlling the point in the alternating current cycle at which said controlled rectifier becomes conducting.

11. A phase controlled alternating current circuit comprising: a pair of alternating current source terminals; a pair of alternating current load terminals; a bridge-type rectifier circuit having a pair of alternating current input terminals and a pair of direct current output terminals to provide a fullwave rectified output; means connecting said alternating current load terminals and said alternating current input terminals in series with said alterating current source terminals; a controlled rectifier having a main current path connected between said pair of direct current output terminals of said rectifier circuit such that forward bias is applied to said controlled rectifier each half cycle of said alternating current source, said controlled rectifier having a control electrode and being capable of operation in a blocking and a conducting state; and means synchronized with the alternating current at said alternating current source terminals and connected to said control electrode for controlling the point in the alternating current cycle at which said controlled rectifier switches from its blocking to its conducting state.

12. A phase controlled alternating current circuit comprising: a pair of alternating current source terminals; a pair of alternating current load terminals; a bridge-type rectifier circuit having a pair of alternating current input terminals and a pair of direct current output terminals to provide a fullwave rectified output; means connecting said alternating current load terminals and said alternating current input terminals in series between said alternating current source terminals; a controlled rectifier having a main current path connected between said pair of direct current output terminals of said rectifier circuit such that forward bias is applied to said controlled rectifier each half cycle of said alternating current source, said controlled rectifier having a control electrode and being capable of operation in a blocking and a conducting state; and means connected to said rectifier circuit and said control electrode for controlling the point in the alternating current cycle at which said controlled rectifier switches from its blocking to its conducting state.

References Cited
UNITED STATES PATENTS

| | | | |
|---|---|---|---|
| 2,920,240 | 1/1960 | Macklem. | |
| 2,751,549 | 6/1956 | Chase | 323—22 |
| 2,925,546 | 2/1960 | Berman | 321—8 |
| 2,931,971 | 4/1960 | May | 321—8 |
| 2,935,674 | 5/1960 | Hohue | 307—88.5 |
| 3,019,355 | 1/1962 | Morgan | 307—88.5 |
| 3,040,270 | 6/1962 | Gutzwiller | 307—88.5 |

OTHER REFERENCES

"Solid-State Thyratron Switches Kilowatts" by B. P. Frenzel and F. W. Gutzwiller; Pub. by Electronics (Mar. 28, 1958); pp. 52–55.

"Notes on the Application of the Silicon Controlled Rectifier," Pub. by Semiconductor Products Dept. of General Electric; Bul. ECG–371–1; December 1958, pp. 40–43.

LEE T. HIX, *Primary Examiner.*

A. D. PELLINEN, *Assistant Examiner.*